United States Patent [19]

Hatano et al.

[11] 3,717,871

[45] Feb. 20, 1973

[54] KEYBOARD INPUT DEVICE

[75] Inventors: Isao Hatano, Akira Nagano, Kazuaki Urasaki, all of Kyoto-fu, Japan

[73] Assignee: Omron Tateisi Electronics Co., Ukyo-ku, Kyoto-shi, Kyoto-ku, Japan

[22] Filed: Nov. 26, 1971

[21] Appl. No.: 202,462

[30] Foreign Application Priority Data

Nov. 25, 1970 Japan ..............................45/118681

[52] U.S. Cl. ..............340/365 E, 340/365 S, 197/98, 340/146.1 AB

[51] Int. Cl. ............................................H04q 3/00

[58] Field of Search..........340/365 S, 365 E, 166 R, 340/146.1 AB 178/17 R; 179/90 K; 197/98

[56] References Cited

UNITED STATES PATENTS 3,662,378 5/1972 MacArthur........................340/365 S

*Primary Examiner*—John W. Caldwell
*Assistant Examiner*—Robert J. Mooney
*Attorney*—Craig, Antonelli & Hill

[57] ABSTRACT

A keyboard input device wherein means is provided for obtaining an inhibit signal to prevent the entry of unnecessary input signals resulting from keys operated in such a way that during depression of one key another key is singly or repeatedly operated. According to the present invention, the inhibit signal obtaining means essentially comprises a combination of a plurality of AND gates.

17 Claims, 6 Drawing Figures

KEYBOARD INPUT DEVICE

Figure 1:
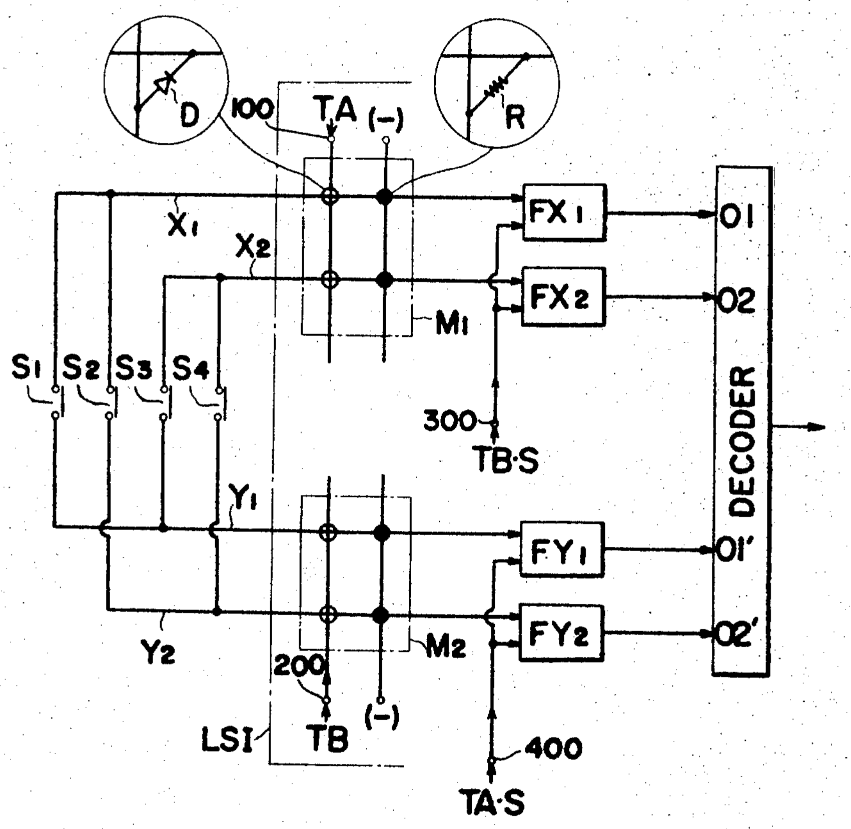

The present invention relates to a keyboard input device of the character generally employed in an electronic desk top calculator and, more particularly, to a keyboard input device wherein provision has been made for obtaining an inhibit signal which may be utilized to prevent the entry of unnecessary input signals in an arithmetic calculation unit of the calculator.

In an attempt to speed up calculations with the use of an electronic calculator, two or more keys on the keyboard are sometimes rapidly depressed in succession. Such a condition of operation is generally referred to as "two key roll-over" in the case where two keys are involved. During this roll-over operation, it often occurs that contact circuits associated with two keys on the keyboard are synchronously completed for a certain period of time despite of the fact that these keys are successively depressed in a rapid sequence. This roll-over operation has heretofore constituted a cause for miscalculation in the electronic calculator and, accordingly, there has been recently proposed an electronic calculator wherein the provision has been made for preventing a miscalculation or an erroneous calculation which may result from this roll-over operation.

However, in such a proposed electronic calculator, there still remains a disadvantage in that, in the event that during depression of one key another key is depressed and released, an input signal indicative of the depression of the first operated key is unnecessarily impressed on the following stage of the calculator circuitry such as an arithmetic calculation unit. Accordingly, unless otherwise the first operated key is released before the release of the subsequently operated key, an erroneous calculation is performed by the calculator.

On the other hand, large scale integrated circuits (LSI) have recently been employed in electronic calculators to reduce the size of the same and to facilitate replacement of a damaged circuit component thereof. Even some components of the keyboard input device to which the present invention pertains are employed in the form of large scale integrated components. However, according to the conventional design practice, the LSI component must be provided with a number of terminal pins for outside connections, the number thereof substantially corresponding to the number of keys or keyboard switch contacts.

In any event, it has been well known that an increase in the number of terminal pins in each LSI component brings about a corresponding increase in the manufacturing cost thereof and, ultimately the calculator will become expensive. To eliminate this disadvantage, there may be various arrangements wherein the number of lines connecting the keyboard switch contacts with the terminal pins of the LSI component is reduced as small as possible. However, in view of the present invention, one exemplary model has ( $M \times N$ ) pairs of first and second contact points of keyboard switch ( $M$ and $N$ : integers ), wherein each pair of said contact points is associated with one character key and adapted to be closed upon depression of the relevant key, which are connected with ( $M+N$ ) pieces of terminal pins of a LSI component by means of a corresponding number of connection lines of two groups; the first of which is associated with the first contact points of the keyboard switches and provided in the number $M$, while the second of which is associated with the second contact points of the keyboard switches and provided in the number $N$.

For a better understanding of the arrangement to which the present invention is applicable, reference is made to FIG. 1 wherein the keyboard input device of an electronic calculator is shown as including four switches, as indicated by $S_1$, $S_2$, $S_3$ and $S_4$, and, hence, the M connection lines of the first group and the N connection lines of the second group are respectively provided in pairs as indicated by $X_1$, $X_2$ and $Y_1$, $Y_2$.

Figure 2:
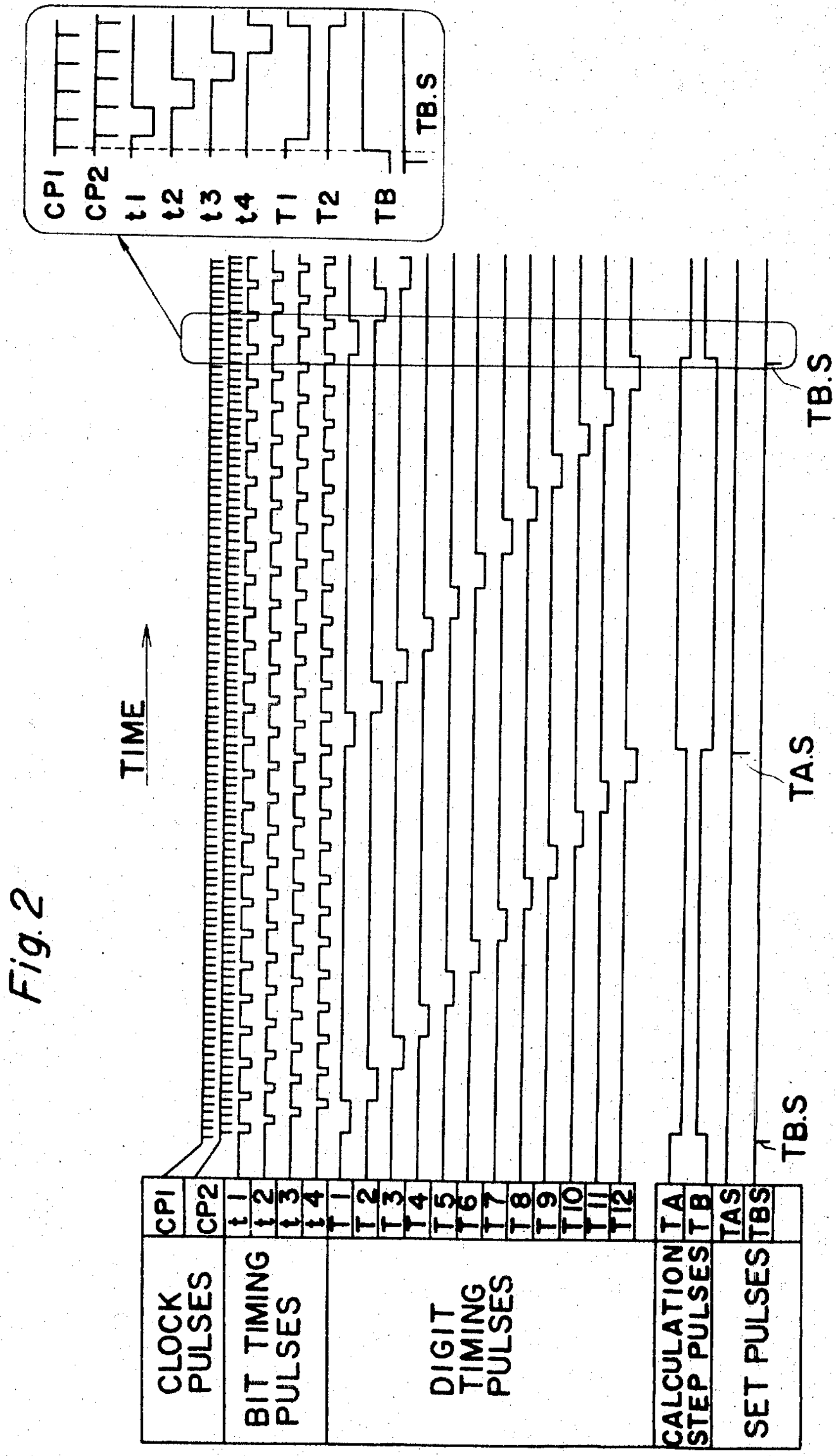

As is well known by those skilled in the art, various components of a calculator including those of a keyboard input device are operated in synchronism with numerous types of pulses and, for better understanding of the prior art and the present invention, description will be first made in connection with these types of pulse employed which are shown in FIG. 2.

Referring now to FIG. 2, two series of clock pulses CP1 and CP2 are used to determine the timing of various pulses as mentioned below. These pulses CP1 and CP2 have the same pulse interval, but are displaced a half cycle with respect to each other.

Bit pulses $t1$, $t2$, $t3$ and $t4$ are generated in a specified order successively in synchronism with each corresponding clock pulse CP2. The pulse width of each of the bit pulses $t1$, $t2$, $t3$ and $t4$ is substantially equal to the pulse interval of the clock pulse CP2. These bit pulses $t1$, $t2$, $t3$ and $t4$ represent binary coded signals of "$2^0$," "$2^1$," "$2^2$," and "$2^3$" positions, respectively.

The digit timing pulses T1, T2, . . . T11 and T12 are usually generated in a specified order in succession during one step of operation of the calculator system. The pulse width of each timing pulse is substantially equal to the sum of pulse widths of the four bit pulses $t1$, $t2$, $t3$ and $t4$ representing one decimal digit or function symbol that has been entered in the calculator.

The calculation pulses TA and TB have a pulse width equal to the sum of pulse widths of the digit timing pulses T1 through T12 representing one step of calculation performed by the calculator.

Referring to FIG. 1, the keyboard switches $S_1$, $S_2$, $S_3$ and $S_4$ are inserted between a first group of connection lines $X_1$ and $X_2$ and a second group of connection lines $Y_1$ and $Y_2$ in a different combination of connection as substantially shown. The connection lines $X_1$ and $X_2$ have their other ends connected with first input terminals of a pair of flip-flop circuits $FX_1$ and $FX_2$ through a matrix $M_1$, respectively. Similarly, the connection lines $Y_1$ and $Y_2$ have other ends connected with first input terminals of a pair of flip-flop circuits $FY_1$ and $FY_2$ through a matrix $M_2$, respectively.

In each of the matrices $M_1$ and $M_2$, each single circle at the line intersections and each double circle at the different line intersections denote a diode D and a resistor R, respectively, as indicated in the enlarged fragments in FIG. 2. It is to be noted that, instead of the diode D, an MOS type transistor may be employed. As shown, the resistor R is adapted to connect each of the connection lines to the negative terminal of a power source.

Figure 4:
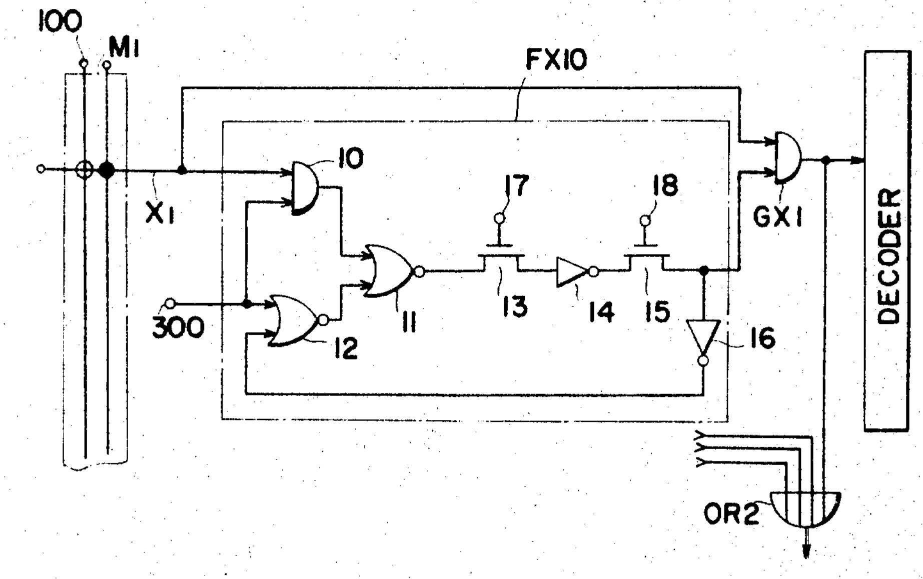

Reference numerals 100 and 200 denote input terminals to which calculation step pulses TA and TB are respectively applied. As shown in FIG. 2, both pulses TA and TB are in inverted relation with respect to each other, namely, when either of the step pulses TA or TB is in the high level state, the other step pulse TB or TA is in the low level state. Reference numeral 300 denotes an input terminal through which a set pulse TB.S can be applied to the flip-flop circuits $FX_1$ and $FX_2$ during the calculation step pulse TB so that a signal indicative of the depression of one of the keys which has been applied to the input terminal of the corresponding one of the flip-flop circuits $FX_1$ and $FX_2$ can be read in. Reference numeral 400 denotes an input terminal through which a set pulse TA.S can be applied to the flip-flop circuits $FY_1$ and $FY_2$ during the duration of the calculation step pulse TA so that a signal indicative of the depression of one of the keys which has been applied to the input terminal of the corresponding one of the flip-flop circuits $FY_1$ and $FY_2$ can be read in. Both set pulses TA.S and TB.S are, as shown in FIG. 2 or FIG. 4, generated near the ends of the durations of the calculation step pulses TA and TB, respectively. An output terminal of each of the flip-flop circuits $FX_1$, $FX_2$, $FY_1$ and $FY_2$ is connected with a decoder, as shown, which is designed to supply to a binary encoder (not shown) an output signal representative of a decimal digit associated with the operated key upon receipt of signals from one of the flip-flop circuits $FX_1$ and $FX_2$ and one of the flip-flop $FY_1$ and $FY_2$.

In the arrangement as hereinbefore described, as long as one of the keys is operated and none of the keyboard switches $S_1$, $S_2$, $S_3$, and $S_4$ is, therefore, closed, each one of the input terminals of the individual flip-flop circuits $FX_1$ and $FX_2$ receives a calculation step pulse TA supplied from the input terminal 100 and, for the duration of this pulse TA, no set pulse TB.S is present at the input terminal 300. Accordingly, neither of these flip-flop circuits $FX_1$ and $FX_2$ can be set. Similarly, each one of the input terminals of the individual flip-flop circuits $FY_1$ and $FY_2$ receives the calculation step pulse TB supplied from the input terminal 200and, during the duration of this pulse TB, no set pulse TA.S is present at the input terminal 400. Accordingly, neither of these flip-flop circuits $FY_1$ and $FY_2$ can be set. Thus, it is clear that no output signals can be applied to the decoder.

If the keyboard switch $S_1$ is subsequently closed, the step pulse TA from the terminal 100 can be applied to both the input terminal of the flip-flop circuit $FX_1$ through the diode D of the matrix $M_1$ and to the input terminal of the flip-flop circuit $FY_1$, while the step pulse TB from the terminal 200 can be applied both to the input terminal of the flip-flop circuit $FY_1$ through the diode D of the matrix $M_2$ and to the input terminal of the flip-flop circuit $FX_1$, in an alternate manner in opposite directions through the keyboard switch S. However, since the set pulse TB.S is adapted to set the flip-flop circuit $FX_1$ or $FX_2$ during the presence of the step pulse TB at the input terminal of flip-flop circuit $FX_1$ or $FX_2$, while the set pulse TA.S is adapted to set the flip-flop circuit $FY_1$ or $FY_2$ during the presence of the step pulse TA at the input terminal of said flip-flop circuit $FY_1$ or $FY_2$, a combination of the flip-flop circuits $FX_1$ and $FY_1$ can be brought into the set state, resulting in that an output signal [ 1 ] from each of these flip-flop circuits $FX_1$ and $FY_1$ can be applied to the decoder.

In a similar manner, in the case where the keyboard switch $S_2$ is closed, the combination of the flip-flop circuits $FX_1$ and $FY_2$ can be set to supply respective output signals [1] to the decoder.

In general, the arrangement above referred to is such that when any one of the ( $M \times N$ ) keys disposed on the keyboard is operated, a combination of one of the flip-flop circuits connected with the keyboard switch associated with the operated key by means of corresponding one of $M$ connection lines and one of the flip-flop circuits connected with the keyboard switch associated with the operated key by means of corresponding one of $N$ connection lines can supply respective output signal to the decoder.

In the arrangement as hereinbefore described, the decoder can be easily designed so that no output signal can be supplied therefrom to the following stage such as a binary encoder when two keys are synchronously depressed. By way of example, matrix circuitry which can generate an inhibit signal to prevent the decoder from generating an output signal when the two keys are synchronously operated may be incorporated in such decoder. However, even if the keyboard input device is constructed with the matrix circuitry being incorporated in the decoder thereof, there is the disadvantage in that unnecessary signals may be applied to an arithmetic calculation unit of the calculator when during the depression of one key another key is operated and released prior to the release of the first operated key.

In other words, although the decoder incorporated with such matrix circuitry prevents the output signal from the decoder from being applied to the following stage as long as two keys are synchronously operated, once the second operated key is released while the first operated key is still depressed, a signal representative of the depression of the first operated key is again applied from the decoder to the following stage. In addition, if during the depression of a key another key is repeatedly operated, for example, five times, five pulses indicative of five depressions of the first operated key will be erroneously applied from the decoder to the following stage.

The present invention has for its essential object to provide an improved keyboard input device wherein means is provided for obtaining an inhibit signal which may be utilized to prevent the entry of unnecessary signals in an arithmetic calculation unit of the calculator in the event that, during the depression of one of the keys disposed on the keyboard, another is depressed and released prior to the release of the first operated key.

Another object of the present invention is to provide an improved keyboard input device of the construction above referred to wherein said means consists of simple and inexpensive elements which afford the reduction of the manufacturing cost of the calculator as compared with that provided with LSI element having a relatively greater number of connection terminal pins.

According to the present invention, it is to be noted that the inhibit signal obtainable by the keyboard input device herein disclosed may be used to ignite a warning lamp so that the operator of the calculator can recognize the occurrence of erroneous calculation in the calculator which results from the release of the subsequently operated key during the depression of the first operated key. Instead thereof, the keyboard input device may be designed such that the inhibit signal thus obtained can be applied to the decoder to inhibit the generation of an output signal therefrom in such event.

Figure 3:
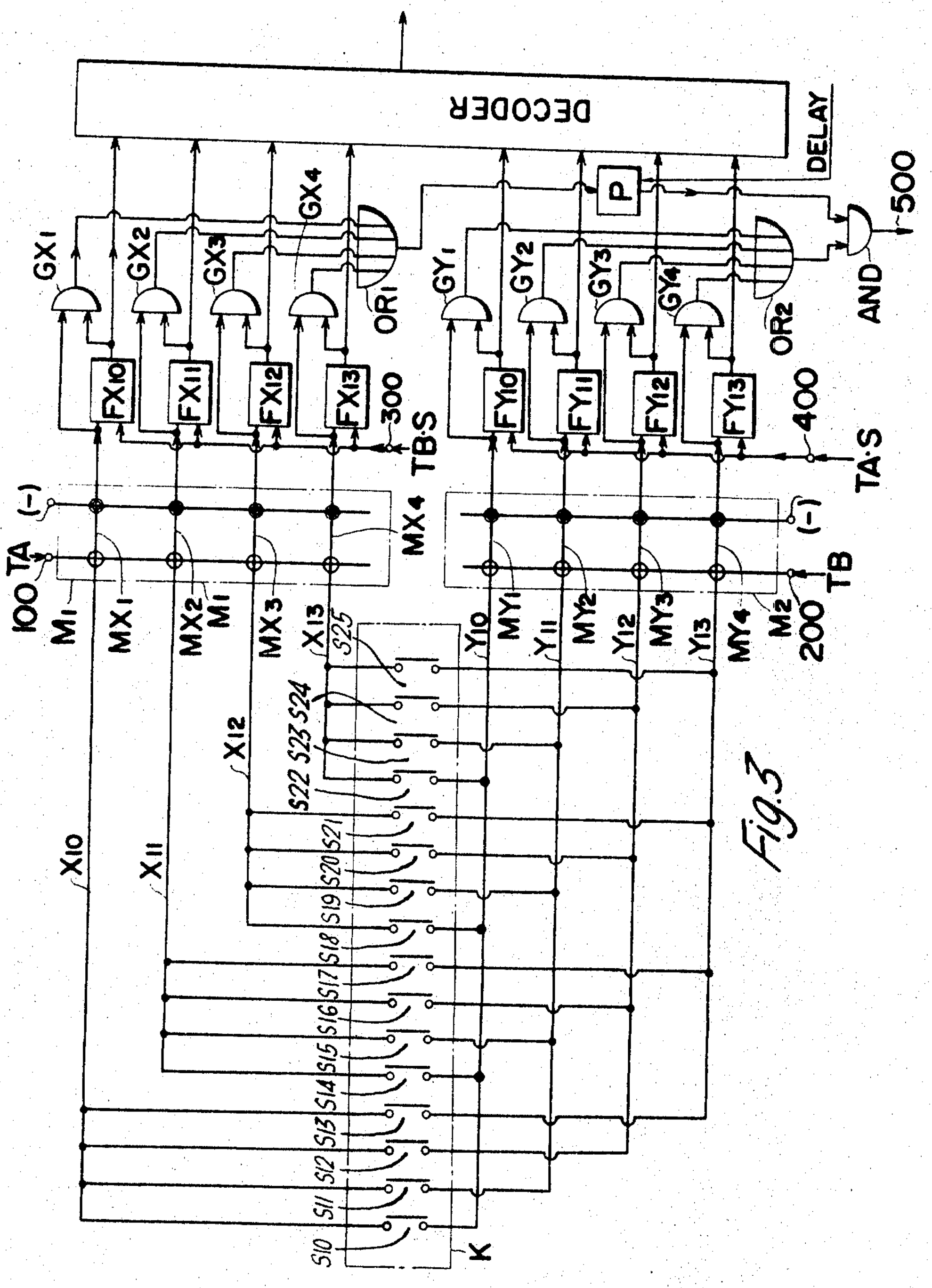
Figure 5:
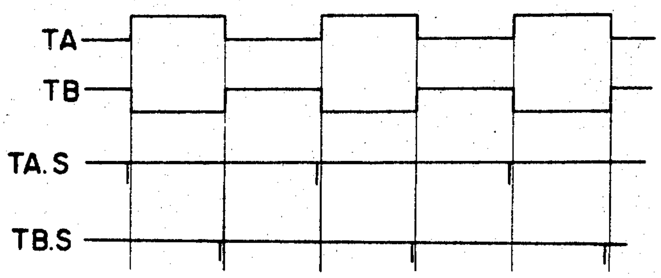
Figure 6:
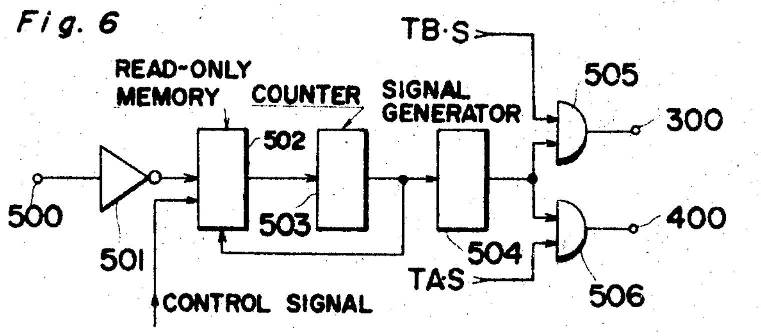

These and other objects and features of the present invention will become apparent from the following description taken by way of example in conjunction with a preferred embodiment of the present invention with reference to the accompanying drawings, in which;

FIG. 1 is a schematic block diagram of a keyboard input device to which the present invention is applicable, FIG. 2 is a timing chart of various pulses employed in an electronic desk-top calculator in general, FIG. 3 is a block diagram of an arrangement of the keyboard input device embodying the present invention, FIG. 4 is a schematic logical diagram of one element employed in the keyboard input device, and FIG. 5 is a timing chart, on a reduced scale, of a portion of FIG. 2, and FIG. 6 is a block diagram showing circuitry for processing an inhibit signal obtainable from the circuitry shown in FIG. 3.

Referring now to FIG. 3, a keyboard of the calculator, generally indicated by K, is shown as having a plurality of keyboard switches $S_{10}$ through $S_{25}$ which are respectively associated with keys (not shown) representing the decimal digits zero to nine and functional symbols as is well known to those skilled in the art. Each of these keyboard switches $S_{10}$ through $S_{25}$ may be of the type having a pair of stationary contact points and a bridging member adapted to connect said stationary contact points or of the type having a fixed contact point and a movable contact point, for which in either case, depression of any one of the keys causes the keyboard switch circuit to be completed.

The keyboard switches $S_{10}$ through $S_{25}$ have respective first and second contact points connected with connection lines $X_{10}$, $X_{11}$, $X_{12}$ and $X_{13}$ of one group and connection lines $Y_{10}$, $Y_{11}$, $Y_{12}$ and $Y_{13}$ of another group in different combinations of connection substantially as shown in FIG. 3. The connection lines $X_{10}$ through $X_{13}$ extend from the corresponding number of flip-flop circuits $FX_{10}$, $FX_{11}$, $FX_{12}$ and $FX_{13}$ through a matrix $M_1$, respectively, in a similar manner as described in connection with FIG. 1, while the connection lines $Y_{10}$ through $Y_{13}$ extend from a corresponding number of flip-flop circuits $FY_{10}$, $FY_{11}$, $FY_{12}$ and $FY_{13}$ through a matrix $M_2$, respectively. It is to be noted that the construction of each matrix is substantially the same as shown in FIG. 1.

There is also provided a plurality of AND gates $GX_1$, $GX_2$, $GX_3$ and $GX_4$, each for one group of the flip-flop circuits $FX_{10}$, $FX_{11}$, $FX_{12}$ and $FX_{13}$ and another plurality of AND gates $GY_1$, $GY_2$, $GY_3$ and $GY_4$, each for another group of the flip-flop circuits $FY_{10}$, $FY_{11}$, $FY_{12}$ and $FY_{13}$. Each of these AND gates GX1 to GX4 and $GY_1$ to $GY_4$ has one input terminal connected with an output line $MX_1$, $MX_2$, $MX_3$, $MX_4$, $MY_1$, $MY_2$, $MY_3$ or $MY_4$ of the matrices $M_1$ and $M_2$ and another input terminal connected with an output terminal of the corresponding one of the flip-flop circuits $FX_{10}$ through $FX_{13}$ and $FY_{10}$ through $FY_{13}$ as shown. The output terminals of the flip-flops of two groups are also connected with the input terminals of a decoder, as shown, the function of which is substantially the same as hereinbefore described with reference to FIG. 1.

Output terminals of two groups of the AND gates $GX_1$ to $GX_4$ and $GY_1$ to $GY_4$ are respectively connected with the input terminals of OR gate $OR_1$ and $OR_2$. As shown, an output terminal of the OR gating element $OR_1$ is connected with one input terminal of an AND gating element AND through a delay circuit P which acts to delay the output from the gating element $OR_1$ a certain period of time substantially equal to the duration of either of the calculation step pulses TA and TB while an output terminal of the OR gate $OR_2$ is connected with another input terminal of the AND gate AND. The output terminal of the AND gate AND is connected with inhibit signal processor circuitry as shown in FIG. 6.

The inhibit signal processing circuitry shown in FIG. 6 includes a series circuit consisting of an inverter 501 adapted to receive an inhibit signal from the AND GATE AND (shown in FIG. 3) through a terminal 500, a read-only memory 502, a step counter 503 and a read-on signal generator 504, and a pair of AND gates 505 and 506.

In the circuitry shown, step counter 503 is employed in the form of a three-bit counter having each bit conditioned in the false state unless a signal from the read-only memory 502 is applied thereto. The AND gate 505 is disposed between the signal generator 504 and the terminal 300 so as to prohibit the passage of the set pulse TB.S there through as long as an inhibit signal is applied to the terminal 500. Similarly, the AND gate 506 is disposed between the signal generator 504 and the terminal 400 so as to prohibit the passage of the set pulse TA.S therethrough as long as an inhibit signal is applied to the terminal 500. It is to be noted that the read-only memory 501 has, in addition to the input terminal to which an output from the inverter 501 is applied, a plurality of input terminals. The signal generator 504 can supply an output signal to the both AND gates 505 and 506 only when the contents of the step counter 503 attain a certain condition. It is further to be noted that the duration of the read-on signal which is the output from the generator 504 is longer than that of the step pulse TA or TB.

The construction of each of the flip-flop circuits $FX_{10}$ to $FX_{13}$ and $FY_{10}$ to $FY_{13}$ is shown in FIG. 4 and description thereof will be made with reference to FIG. 4. It is to be noted that the flip-flop circuits $FX_{10}$ to $FX_{13}$ and $FY_{10}$ to $FY_{13}$ have the same construction and, therefore, description will be made in connection with one of them, for example, such as designated by $FX_{10}$.

Referring to FIG. 4, the flip-flop circuit includes an AND gate 10 having one input terminal connected with the connection line $X_{10}$ and another input terminal connected with an terminal 300 through which the set pulse TB.S can be applied. An output terminal of AND GATE 10 is connected with one input terminal of a NOR gate 11, another input terminal of NOR gate 11 being connected with an output terminal of a NOR gate 12. An output terminal of the NOR gate 11 is connected with the decoder through a series circuit consisting of a MOS type transistor 13, an inverter 14 and another MOS type transistor 15 in a specified order. An output terminal of the MOS type transistor 15 is also connected with an input terminal of NOR gate 12 through another inverter 16, the other input terminal of said element 12 being connected with the terminal 300. Reference characters 17 and 18 denote terminals through which the clock pulses CP1 and CP2 can be respectively applied to the gates of the MOS type transistors 13 and 15 so that the latter can be triggered on.

The construction of the flip-flop circuit above referred to which acts to read in and read out on the strength of the clock pulses CP1 and CP2 is well known to those skilled in the art.

In the arrangement of the keyboard input device as hereinbefore described, the operation thereof will be hereinafter described with reference to FIGS. 3 and 5.

Assuming that the keyboard switch $S_{10}$ is not closed, a signal present on the connection line $X_{10}$ is at a high level for the duration of the calculation step pulse TA, while the signal present at the terminal 300 to which the set pulse TB.S is applied for the duration of the step pulse TB is at a low level. Therefore, the output of the AND gate 10 is [0]. If the output of the MOS type transistor 15 is assumed to be [0] at this time, this output signal [0] from the MOS type transistor 15 can be inverted into [1] by the inverter 16 which is in turn applied to NOR gate 12 and, accordingly, the output of NOR gate 12 is [0]. Hence, both inputs of the NOR gate 11 are [0]. As a result, the output of NOR gate 11 is [1] and is applied to the inverter 14 through the MOS type transistor 14 upon application of the clock pulse CP1 to said transistor 14. The signal [1] thus applied to the inverter 14 is then inverted into [0] as it passes through the inverter 14.

On the other hand, even during the step pulse TB, a signal present on the connection line $X_{10}$ is at a low level and, since the inputs of AND gate element 10 do not coincide with each other, the output of AND gate 10 is, therefore, [0]. However, as a result NOR gate 11 receives [0] inputs and hence, generates an output [1] which is, in turn, applied to inverter 11 where this output signal [1] from NOR gate 11 can be inverted into [0].

From the foregoing, it is clear that, unless a key on the keyboard which is associated with the flip-flop circuit $FX_1$ is depressed, for example, the keyboard switch $S_{10}$ is closed, the flip-flop circuit $FX_{10}$ cannot be set.

However, when the keyboard switch $S_{10}$ is closed upon depression of the key, a high level signal can be supplied to the connection line $X_{10}$ through the switch $S_{10}$ by means of the connection line $Y_{10}$ during the step pulse TB. Upon application of the set pulse TB.S to the terminal 300 while in this condition, AND gate 10 generates an output signal [1] which is, in turn, supplied to NOR gate 11. As a result, NOR gate 11 supplies a signal [0] to the inverter 14 where the output signal from NOR gate 11 is inverted into [1].

The output signal [1] of the inverter 14 is then applied to the inverter 16 which supplies an output signal [0] to NOR gate 12. Accordingly, unless the set pulse TB.S is applied to the terminal 300, input signals applied to NOR gate 12 are respectively [0] and, accordingly, the output thereof is [1] and the output of NOR gate 11 becomes [0].

Hence, even if the signal to be applied to gate 10 through the connection line $X_{10}$ is interrupted, NOR gate 11 continues to generate an output signal [0] on the strength of the output signal [1] from NOR gate 12. The output signal [0] from NOR gate 11 can be inverted into [1] by the inverter 14, so that the output signal from the MOS type transistor 15 becomes [1], this condition being maintained until the set pulse TB.S is applied to the terminal 300.

The operation of the flip-flop circuit $FX_{10}$ brought about by the depression of the key related with the keyboard switch $S_{10}$ may be similarly applied to that of the flip-flop circuit $FY_{10}$ which is also associated with the keyboard switch $S_{10}$. In addition, the same operational process can proceed even when one of the keyboard switches other than as designated by $S_{10}$ is closed. Accordingly, it is clear that, each time any one of the keys on the keyboard is operated, a signal representative of depression of the relevant key can be obtained from the decoder.

However, if during the closure of the keyboard switch $S_{10}$, another keyboard switch $S_{11}$ associated with a different key is switched on and released, AND gate $GX_1$ receives input signals from the matrix $MX_1$ and the flip-flop $FX_{10}$ since the latter stores an indication that the key related with the keyboard switch $S_{10}$ has been initially operated and, therefore, AND gate $GX_1$ generates an output signal [1]. Similarly, since the flip-flop circuit $FY_1$ also stores information that the key related with the keyboard switch $S_{10}$ has been initially operated, AND gate $GY_1$ generates an output signal [1].

The output signals from AND gates $GX_1$ and $GY_1$ are then applied to OR gates $OR_1$ and $OR_2$, respectively. However, since the output signal [1] from AND gate $GX_1$ is generated during the duration of the step pulse TB, while the output signal [1] from AND gate $GY_1$ is generated during the duration of the step pulse TA which is delayed one pulse width of the step pulse TA, only the output signal [1] from gate $OR_1$ is adapted to pass through the delay circuit P so that the output signals [1] from gates $OR_1$ and $OR_2$ can be synchronized. The AND gate AND can be triggered on upon receipt of these synchronized signals [1], to thereby generate an inhibit signal therefrom.

In the event that two keys are successively operated in a rolled-over manner in which condition, for example, during the closure of the keyboard switch $S_{10}$, the keyboard switch $S_{11}$ is closed and thereafter the keyboard switch $S_{10}$ that has been closed is released, a pair of the flip-flop circuits $FX_{10}$ and $FY_{10}$ are first brought into the set condition in response to the closure of the keyboard switch $S_{10}$ and thereafter another pair of the flip-flop circuits $FX_{11}$ and $FY_{11}$ can be brought into the set condition in response to the subsequent closure of the keyboard switch $S_{11}$. In this case, since the flip-flop circuit $FX_{10}$ has been first brought into the set condition by the closure of the keyboard switch $S_{10}$, the logical output of AND gate element $GX_1$ is [1] while no logical output can be obtained from AND gate $GY_2$ since the flip-flop circuit $FY_{11}$ has not yet been brought into the set condition at the time when the keyboard switch $S_{10}$ is released. Therefore, the output signal from OR gate $OR_2$ is [0]. As a result thereof, the output signal from AND gate AND becomes [0], which means that no inhibit signal can be generated from AND gate AND. Instead, an instruction that the key related with the keyboard switch $S_{11}$ is operated after the key related with the keyboard switch $S_{10}$ has been operated is given to the decoder.

Referring now to FIG. 6 in which circuitry is shown in a block diagram for handling the inhibit signal. In this circuitry shown by way of example, as long as the inhibit signal from AND gate AND is not applied to the terminal 500, the inverter 501 generates an output signal [1] which is, in turn, applied to the read-only memory 502. The read-only memory 502 is so constructed that it will generate an output signal to the counter 503 only when the output of the inverter is [1] and, concurrently, signals representative of the depression of one or more keys are applied thereto from the keyboard unit K. The counter 503 commences its operation upon receipt of the output signal from memory 502 and generates an output signal [1] at the time when the content of said counter 503 attains a predetermined condition, thereby to cause the generator 504 to generate a read-on signal. As hereinbefore described, the read-on signal is, in turn, applied to gates 505 and 506 through which the set pulses TB.S and TA.S are respectively passed during the duration of the read-on signal. The set pulses are, in turn, applied to the terminals 300 and 400, respectively and, thereafter, applied to the flip-flop circuits as hereinbefore described.

On the other hand, in the event that, in the manner as hereinbefore described, the inhibit signal is applied to the terminal 500 from AND gate AND, this inhibit signal can be inverted into a signal [0] by the inverter 501, which is, in turn, applied to the read-only memory 502. However, since the output signal from the read-only memory 502 is also [0], the counter 503 does not operate so as to shift the content stored therein. Accordingly, no output signal from the counter 503 is generated and, hence the generator 504 supplies no output signal to AND gates 505 and 506. Thus, it is clear that, unless the set pulses TB.S and TA.S are respectively applied to the flip-flop circuits, no signals are applied to the decoder. This means that, as long as an inhibit signal is generated, no input signal representative of depression of a certain numeric key will be entered in the calculator.

Although the present invention has been fully described by way of example of connection with the preferred embodiment thereof, it is to be noted that various changes and modifications are apparent to those skilled in the art and, therefore, the present invention is not to be limited thereby unless otherwise departing from the scope of the present invention. For example, although in the foregoing embodiment the set pulse TB.S has been employed to set each flip-flop circuit $FX_{10}$, $FX_{11}$, $FX_{12}$ or $FX_{13}$, any signal generated during the presence of the step pulse TB at the terminal 200 may be employed therefor. The same may apply to the set pulse TA.S with respect to the flip-flop circuit $FY_{10}$, $FY_{11}$, $FY_{12}$ or $FY_{13}$.

We claim:

1. In a keyboard input device including ( $M \times N$ ) pairs of first and second contact points of keyboard switches operatively associated with the corresponding number of keys disposed on a keyboard wherein $M$ and $N$ are respectively integers and each pair of which is adapted to be closed upon depression of the corresponding one of said keys, said first and second contact points being connected with ( $M + N$ ) sets of storing means for storing a pair of input signals indicative of depression of any selected one of said keys through $M$ and $N$ connection lines of first and second groups, the improvement comprising:

a plurality of first AND gates, each associated with said storing means;

a pair of input terminals, one of which is connected with an output terminal of said storing means and one of said keyboard switches and a second AND gate adapted to receive a signal from one of said first AND gates associated with the first group of $M$ connection lines and a signal from one of said first AND gates associated with the second group of $N$ connection lines, said second mentioned signal being passed through a delay circuit, said second AND gate being capable of generating, upon receipt of said first and second mentioned signals, an inhibit signal which may be used to prevent the entry of an unnecessary input signal to the following stage of circuitry.

2. The improvement according to claim 1, which further comprises a inhibit signal processing circuit adapted to receive said inhibit signal, to thereby inhibit the entry of an unnecessary input signal to the following stage of circuitry.

3. The improvement according to claim 1, wherein said keyboard switches are associated with the corresponding number of keys disposed on a keyboard of an electronic calculator.

4. In a keyboard input device including $M \times N$ pairs of first and second contact points of keyboard switches correspondingly connected with a number of keys disposed on a keyboard, wherein $M$ and $N$ are integers and each pair of contact points is closed upon the depression of a respective one of said keys, said first and second contact points being connected with ( $M + N$ ) sets of storing means for storing a pair of input signals representative of the depression of a selected one of said keys through $M$ and $N$ conductors of first and second groups, and a set of output terminals for receiving the outputs of said storing means to be supplied to further processing circuitry, the improvement comprising:

error prevention means, responsive to the depression of a selected one of said keys, for enabling the supply of output signals from only one of said storing means to said output terminals, said one storing means corresponding to that storing means receiving input signals corresponding to said selected key which has been depressed when no other keys have been depressed.

5. The improvement according to claim 4, further including inhibiting circuit means, responsive to the output of said error prevention means, for inhibiting the storage of a signal representative of the depression of one of said keys during the enabling operation of said error prevention means.

6. The improvement according to claim 4, wherein said error prevention means comprises a plurality of first AND gates, each of which is connected to a respective one of said storing means, a pair of input terminals, one of which is connected with an output terminal of said storing means and one of said keyboard switches, and a second AND gate, one input of which is connected to the output of said storing means associated with the group of $M$ conductors and a second input of which is connected to the output of said storing means associated with the group of $N$ conductors through a delay circuit, the output of said second AND gate providing a signal for enabling said supply of output signals from only one of said storing means.

7. The improvement according to claim 5, wherein said inhibiting circuit means comprises a first inverter circuit, a read-only memory, a counter, and a read-on signal generator connected in series the input of said first invertor circuit being connected to the output of said error prevention means, and further including a pair of storage control AND gates, each having a common input connected to the output of said read-on signal generator, and respective inputs connected to receive storage signals to be supplied to said storing means, the outputs of said storage control AND gates being connected to said storing means of said ( $M+N$ ) sets of storing means.

8. The improvement according to claim 7, wherein the output of said counter is connected to said read-only memory and said read-only memory further includes a control input terminal for receiving a control signal therefor.

9. The improvement according to claim 4, wherein each of said storing means comprises a flip-flop circuit, including an input AND gate for receiving both said input signals of said pair, a first NOR gate connected in common to one of the inputs of said input AND gate, a second NOR gate having a pair of inputs which are respectively connected to the output of said input AND gate and said first NOR gate, and a pair of series coupled switching circuits connected between the output of said second NOR gate and the output of said flip-flop for supplying an output signal from said flip-flop and being connected through an invertor circuit to said first NOR gate.

10. The improvement according to claim 9, wherein said pair of series coupled switching circuits are coupled through an additional invertor circuit.

11. The improvement according to claim 5, wherein said error prevention means comprises a plurality of first AND gates, each of which is connected to a respective one of said storing means, a pair of input terminals, one of which is connected with an output terminal of said storing means and one of said keyboard switches, and a second AND gate, one input of which is connected to the output of said storing means associated with the group of $M$ conductors and a second input of which is connected to the output of said storing means associated with the group of $N$ conductors through a delay circuit, the output of said second AND gate providing a signal for enabling said supply of output signals from only one of said storing means.

12. The improvement according to claim 11, wherein said inhibiting circuit means comprises a first inverter circuit, a read-only memory, a counter, and a read-on signal generator connected in series the input of said first invertor circuit being connected to the output of said error prevention means, and further including a pair of storage control AND gates, each having a common input connected to the output of said read-on signal generator, and respective inputs connected to receive storage signals to be supplied to said storing means, the outputs of said storage control AND gates being connected to said storing means of said ( $M+N$ ) sets of storing means.

13. The improvement according to claim 11, wherein each of said storing means comprises a flip-flop circuit, including an input AND gate for receiving both said input signals of said pair, a first NOR gate connected in common to one of the inputs of said input AND gate, a second NOR gate having a pair of inputs which are respectively connected to the output of said input AND gate and said first NOR gate, and a pair of series coupled switching circuits connected between the output of said second NOR gate and the output of said flip-flop for supplying an output signal from said flip-flop and being connected through an invertor circuit to said first NOR gate.

14. The improvement according to claim 12, wherein each of said storing means comprises a flip-flop circuit, including an input AND gate for receiving both said input signals of said pair, a first NOR gate connected in common to one of the inputs of said input AND gate, a second NOR gate having a pair of inputs which are respectively connected to the output of said input AND gate and said first NOR gate, and a pair of series coupled switching circuits connected between the output of said second NOR gate and the output of said flip-flop for supplying an output signal from said flip-flop and being connected through an invertor circuit to said first NOR gate.

15. The improvement according to claim 14, wherein said pair of series coupled switching circuits are coupled through an additional invertor circuit.

16. The improvement according to claim 15, wherein the output of said counter is connected to said read-only memory and said read-only memory further includes a control input terminal for receiving a control signal therefor.

17. The improvement according to claim 16, further including first and second OR gates respectively connected between the outputs of said ( $M+N$ ) sets of storing means to one input of said second AND gate and to said delay circuit.

* * * * *